July 27, 1948.    M. STAUNT    2,445,891
DENTAL HAND PIECE
Filed Sept. 13, 1945
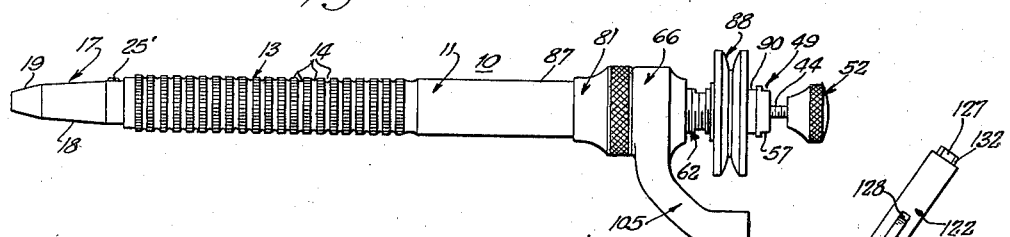
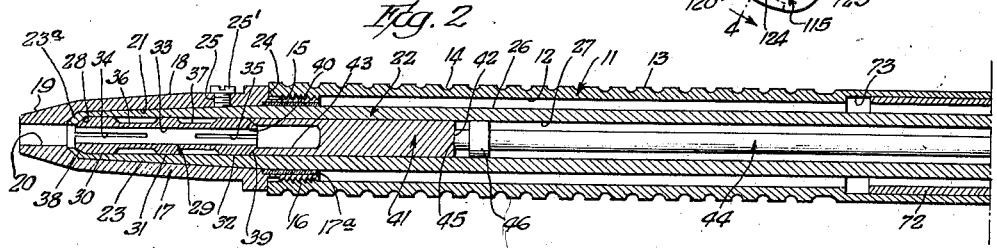
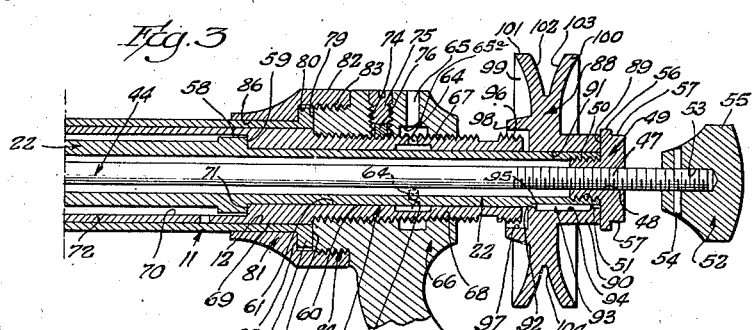
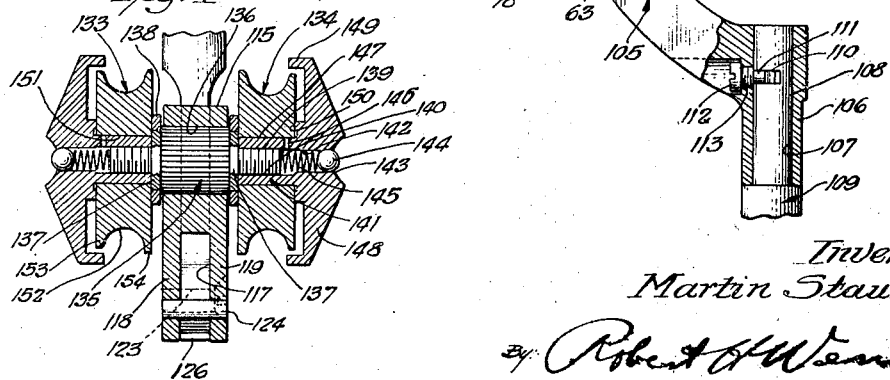
Inventor:
Martin Staunt
By Robert H. Wendt
Atty Patented July 27, 1948

2,445,891

UNITED STATES PATENT OFFICE 2,445,891

DENTAL HAND PIECE

Martin Staunt, Chicago, Ill.

Application September 13, 1945, Serial No. 616,130

1 Claim. (Cl. 32—26)

The present invention relates to dental hand pieces, and is particularly concerned with dental hand pieces of the type which are to be driven by means of a belt and pulley, and which includes a suitable chuck for holding the various drills, burrs, sanding wheels, etc. used with dental hand pieces.

One of the objects of the invention is the provision of an improved dental hand piece of the class described in which improved forms of bearings are utilized, which by virtue of the particular material utilized in the spindle permit the use of relatively small bearings, but the bearings may be used for a long period of time without substantial wear.

Another object of the invention is the provision of an improved external handle structure including serrated ribs and partially circular grooves which improve the sanitation of the hand piece by reason of the fact that the grooves are more easily cleaned than the devices of the prior art.

Another object of the invention is the provision of an improved pulley structure for such hand pieces, in which provision is made to prevent the splashing of the oil and for the quick removal of the pulley by means of a threaded gland that holds the tightening rod and threaded shaft.

Another object of the invention is the provision of an improved wrist joint structure, including a stop for limiting the rotative motion at the wrist joint, which is adapted to be manufactured more economically, and which is easy to attach and easy to remove for use with other attachments.

Another object of the invention is the provision of an improved streamlined structure from which the sharp corners have been removed so much that the mouth of the patient and the hands of the operator are more effectively protected against injury.

Another object of the invention is the provision of an improved stop for limiting rotative motion at the wrist joint, all of the parts of which are housed in suitable recesses so that there are no projecting parts and there are no sharp parts which rub against the belt and tend to wear it.

Other objects and advantages of the invention will be apparent from the following description and the accompanying drawings, in which similar characters of reference indicate similar parts throughout the several views.

A divisional application, Serial Number 14,561 has been filed on February 4, 1948.

Referring to the single sheet of drawings,

Fig. 1 is a side elevational view of a dental hand piece embodying my invention;

Fig. 2 is a fragmentary axial sectional view of the operating end of the hand piece;

Fig. 3 is another fragmentary axial sectional view of the rear end portion of the hand piece;

Fig. 4 is a fragmentary sectional view, taken on a plane passing through the axis of the pulleys, that is, the plane along the line 4—4 of Fig. 1.

The dental hand piece embodying my invention is shown in side elevation in Fig. 1, and is indicated in its entirety by the numeral 10. It preferably includes a sheath 11, which may consist of a tubular metal member preferably made of stainless steel or carbon steel, having an axial bore 12 and an external cylindrical surface 13, which is provided with a multiplicity of partially circular parallel grooves 14.

The ridge portions or cylindrical surfaces 13 between the grooves are preferably knurled for nonslipping grip with the fingers, and the provision of grooves and ribs also aids in permitting the operator to grip the hand piece without slipping. The partially circular nature of the grooves 14 permits them to be cleaned more easily, as there are no corners in which dirt can accumulate, and aids in maintaining sanitary conditions.

At its left end the sheath 11 is provided with internal threads 15 for engagement with the external threads 16 on the front bearing member 17. The member 17 is preferably constructed of case hardened screw steel stock. The front bearing member 17 preferably consists of a tubular metal member, the external surfaces of which are tapered at 18 and 19 toward the open end, which has a bore 20.

The front bearing member 17 has a tapered counterbore 21, which serves as a front end bearing for the spindle 22, which has a complementary external frusto-conical surface 23. The front bearing member 17 also has an annular shoulder 24 against which the end of the sheath 11 abuts when it is threaded home by means of the threads 15, 16. At one side the front bearing member is preferably provided with a threaded bore 25, extending radially, and adapted to receive the screw bolt 25' by means of which other attachments are secured to the front end of the hand piece, in such manner that the attachment housing does not rotate. Such attachments preferably have a spindle that is held in the chuck and a housing that slides on the nose of the hand piece, and have a slot for the screw bolt 25'.

The spindle 22 is preferably cylindrical on its outer surface, inside the bearing sleeve 17a, but also preferably has a taper extending from said bearing sleeve toward the end of the spindle, where a relatively sharp tapered surface 23a is provided. The internal surface of the bearing member 17 is complementary in shape.

The spindle comprises an elongated metal member, which is tubular in shape. Over the major portion of its length it has an external cylindrical surface 26. It is provided with an internal cylindrical bore 27, which terminates at the front end in a frusto-conical surface 28 for engaging one end of the collet 29.

The front bearing member 17 is provided with a cylindrical bearing sleeve 17a, having a frictional fit in a complementary recess located at the cylindrical end portion of the front bearing member 17, that is, at the right end, beneath the threads 15.

The spindle 22 is preferably made of steel which is initially plated with a layer of chromium, such as, for example, five thousandths of an inch thick. This chromium covered steel spindle may be ground down until its chromium covering is substantially three thousandths in grinding the spindle to fit the bearings.

The bearing sleeve 17a is preferably constructed of a hard alloy, and such a combination of chromium plated spindle and hard alloy bearing is adapted to give long use with a minimum amount of wear or vibration.

The collet 29 is adapted to grip the stem of a burr or the shank of a sanding wheel, or any other tool; and it consists of a substantially tubular metal member having the external cylindrical surfaces 30, 31, 32.

The collet 29 has a cylindrical through bore 33, which is approximately the same size as the shank which it is intended to receive, having a close sliding fit with the shank. Each end portion of the collet is provided with a plurality, preferably three, axially extending slots 34, 35, the slots being equally spaced in an angular sense and separating the end portions of the collet into three separate legs.

The external body of the collet is preferably grooved or relieved at 36 and 37 adjacent the end portions so as to increase the flexibility of the legs, which are formed by the slots 34, 35 adjacent the base of the slots. At each end of the collet there is a tapered or frusto-conical portion 38, 39, which when engaged by a complementary frusto-conical surface may tend to cause the end portions of the collet to contract and to grip a shank in the bore 33.

The frusto-conical surface on the front end of the collet at 38 engages the complementary frusto-conical surface 28 inside the spindle. The frusto-conical surface 39 at the other end of the collet, that is, the right end (Fig. 2), engages a complementary inner frusto-conical surface 40 on a plunger 41.

The plunger 41 merely consists of a cylindrical metal member having a sliding fit in the bore 27 of the spindle 22. The right end 42 of the plunger may have a plane surface, while the opposite end preferably has a bore 43, and the annular end surface terminates in the frusto-conical surface 40, previously mentioned.

The natural tendency of the collet is for its end portions to spring outwardly into cylindrical form; but, when forced toward the left in Fig. 2 by the plunger 41 the end portions of the collet are cammed inwardly toward each other, diminishing the size of the slots 34, 35, while the collet grips a shank.

The spindle bore 27 also houses the tightening rod 44, consisting of an elongated metal rod having a plane end surface 45 for abutting against the end 42 of the plunger 41. Adjacent the end 45 the tightening rod 44 has a cylindrical enlargement 46, which has a sliding fit in the spindle bore 27 and centers the tightening rod at this end. At its opposite end in Fig. 3 the tightening rod 44 has a threaded portion 47, the threads of which are complementary to the internal threads 48 in a threaded gland 49, the threaded portion 50 of which engages the internal threads 51 in the end of the tubular spindle 22.

A steel knob 52 may be threaded on the end of the tightening rod 44 by means of a threaded bore 53, and may be secured in place by being soldered to the rod 44 or by a frictional pin 54, which passes through both the knob and the threaded portion of the tightening rod 44. The cylindrical edge surface 55 of the knob 52 is preferably knurled, and the length of the length of the threaded portion 47 is such as to permit longitudinal adjustment of the tightening rod 44 by means of its threads 47.

The gland 49 has a radially extending flange provided with a cylindrical knurled surface 56, but at two diametrically opposite points on the gland 49 there are parallel flat surfaces 57 for engagement with a small wrench.

The spindle 22 (Fig. 3) may be provided with a cylindrical thrust ring 58 pressed on the spindle, and has an annular surface 59 serving as a thrust bearing. Beyond the thrust surface 59 and toward the right in Fig. 3 the spindle 22 has a reduced cylindrical portion 60, which serves as a trunnion for engagement in the cylindrical bore 61 of the rear bearing 62.

This rear bearing member 62 is also preferably constructed of hardened steel or bronze, and is provided with an annular lubricant groove 63 communicating with a radial aperture 64. This aperture communicates with a plurality of radially extending apertures 65, regularly spaced about the periphery of the rear bearing member 63.

These apertures 65 communicate with an annular slot 65a in the inner threaded surface 66 of the wrist joint frame so that the aperture 65 will be constantly in communication through the slot 65a with the apertures 64, even though the wrist joint is adjusted longitudinally on the rear bearing member. Lubricant, which enters at 65, finds its way about the spindle 22 in the annular groove 63, from which it spreads longitudinally on the cylindrical trunnion 60 inside the cylindrical bearing 62.

The rear bearing 62 has a substantially cylindrical threaded member 67 adapted to be received in the threaded bore 68 of the wrist joint frame. At the left, beyond the wrist joint frame, the rear bearing 62 has an enlarged cylindrical portion 69, which has a substantial fit in the cylindrical bore 12 of the sheath 11.

The bore 61 of the rear bearing 62 communicates with an enlarged counterbore 70, beginning at the thrust washer 58, where there is an annular thrust surface 71 engaging the thrust surface 59 on the thrust washer 58.

To the left of the thrust washer 58 the spindle 22 is substantially smaller than the bore 70 in the rear bearing 62 or the bore 12 in the sheath 11. The cylindrical skirt 72 on the rear bearing 62 extends into an enlarged counterbore 73 in the sheath 11, and the length of these two complementary members, that is, this portion of the sheath and the skirt on the bearing serve to hold the bearing accurately in concentric position with respect to the sheath.

The wrist joint frame is also preferably provided with a radially extending threaded bore 74 (Fig. 3) having a screw bolt 75 which engages a slug 76, driving it into tight engagement with the threads 67 to maintain the adjustment of the wrist joint frame on the bearing 62.

The slug 76 has at its end threaded formations complementary to the threads 67 so that the set screw 75 may clamp the slug 76 against the threads 67 without deforming or mutilating the threads. The slug 76 is of the same shape at its end as the threads and, as it does not rotate, it does not mutilate the threads.

There is rotating engagement between the slug 76 and the screw bolt 75, which preferably has a slot for receiving the screw driver or tool.

It is by means of the adjustment of the wrist joint frame 66 on the threads 67 that bearing wear may be taken up at the front bearings 17, as a longitudinal adjustment of the spindle 22 toward this front bearing will cause the tapered surfaces 23 on the spindle 22 and on the bearing 17 to come into closer engagement with each other to take up wear.

The sheath 13 is provided with a radially extending securing flange 77 and a plane end surface 78 that abuts against the plane end surface 79 on the wrist joint frame 66. The radial flange 77 is preferably circular and adapted to be received in the bore 80 of a union nut 81, which has an external cylindrical knurled surface 82. The nut 81 has threads 83 in the bore 82 for engaging threads 84 on the left end of the wrist joint frame 66 (Fig. 3).

An annular surface 85 on the inside of the bore 79 of the union nut 81 engages the radial flange 77 and draws the sheath 11 into tight engagement with the wrist joint frame 66. The union nut 81 has a bore 86 for receiving the smooth cylindrical body portion 87 of the sheath 11.

The spindle 22 has a pulley 88 fixedly secured to the right end of the spindle by means of gland 49, the annular surface 89 of which engages the end of the hub 90 of the pulley 88. The pulley 88 has a cylindrical bore 91 having a sliding fit on the right end of spindle 22 (Fig. 3).

The spindle 22 preferably has a partially cylindrical groove 92 extending in an axial direction adapted to receive the pin 93, which is driven into a bore 94 in the hub 90 of the pulley 88 in such manner that the pin abuts against the end 95 of the bore 94 and projects radially into the bore 90 of the pulley 88 so that it may be received in the groove 92.

The bore 94 is actually in the shape of a groove of cylindrical shape embodying more than half of a cylindrical recess so as to retain the pin 93 in the hub when the pulley 88 is removed. Furthermore, the pin is driven tightly into the hub and substantially riveted and expanded therein. Thus the pulley 88 is prevented from rotating with respect to the spindle 22, and it is held on the spindle 22 by the gland 49.

The gear bearing 62 preferably has a tubular extension which is externally threaded at 96, extending inside the bore 97, which is provided by an axially extending tubular skirt 98. This skirt 98 prevents any lubricant which might find its way out of the bearing 62 from splashing, and leakage is further reduced by the fact that the lubricant must pass along the threaded surface 96 to get on the outside of the bearing 62.

The pulley 88 preferably has a pair of pulley flanges 99, 100, which flare outwardly away from each other and have cylindrical outer surfaces 101. The adjacent inner surfaces 102, 103 form a V-shaped groove, which bells outward at the edge of the pulley so as to insure the engagement with the belt and a tight driving engagement by the belt wedging into the smaller internal portions of the groove 104.

The wrist joint frame has a supporting arm 105, which extends radially outward from the body portion having the bore 68 and preferably curves through substantially ninety degrees. The arm 105 supports a cylindrical portion 106 that extends at right angles to the spindle 22, and the cylindrical portion 106 has an axial bore 107. This axial bore provides a bearing for the trunnion 108 of the wrist joint swivel arm 109.

In order to retain the trunnion 108 in the bearing 107 and to limit its motion the trunnion 108 is provided with an arcuate slot 110 of limited length extending over substantially 270 degrees and adapted to receive the reduced cylindrical end 111 of a screw bolt 112, which is threaded into a threaded bore 113 located in the bearing 106.

Thus the wrist joint swivel arm 109 may turn until the end 111 of the screw bolt 112 engages either end of the slot 110. Axial movement of the trunnion 108 in the bearing 106 is prevented by the screw bolt 112 in the slot 110.

The wrist joint swivel arm has a flattened end portion 114 which is pivotally mounted in a wrist joint swivel frame 115 by means of a screw bolt 116. The wrist joint swivel frame comprises a flat metal member of substantially triangular form, which is provided with a slot 117, which is rectangular in shape and is bounded by a pair of flat parallel flanges 118 and 119.

The slot 117 over the full length of the base 120 of the triangle and substantially half way up both of the other sides of the triangle, and this slot is adapted to receive the flattened end portions 114, 121 of the front wrist joint swivel arm 109 and the rear wrist joint swivel arm 122.

The latter is pivoted on the wrist joint swivel frame by means of the screw bolt 123. Each of the screw bolts 116 and 123 have their heads embedded in counterbores in the upper flange 119 (Fig. 1) and have cylindrical portions adapted to serve as trunnions or pintles located in the slot 117 and threaded portions threaded into threaded bores in the lower flange 118, as indicated in dotted lines in Fig. 4.

The intermediate pin 124 is riveted in both of the flanges 118, 119 and passed through the slot 117 midway between the two screw bolts 116, 123 and serves as a stop for engaging the flat shoulder 125 on each of the pivot flanges 114, 121 of the wrist joint swivel arms. The remainder of the edge of the pivot flange is substantially circular, as indicated at 126, so as to clear the pin 124. Thus the wrist joint swivel arms can move to a position where they are almost in line with each other or to a position in which they extend at an acute angle, as shown in Fig. 1, permitting the maximum freedom of movement of the hand piece itself in the hands of the operator.

The rear wrist joint swivel arm 122 is provided with an axial bore 127, which extends rearwardly to a point past the radial aperture 128, into which the inwardly turned end of a leaf spring 129 extends.

The leaf spring is preferably secured in a groove 130 by having a screw bolt 131 pass through the end of the leaf spring, the bolt being threaded into the arm 122. At its end the tubular arm 122 has an axially extending, partially annular portion 132, which engages in a slot complementary to it on the arm, to which it is attached, this arm having a shank that passes into the bore 127, and having a hole for receiving the end of the spring 129.

The wrist joint swivel frame 115 is shown in section in Fig. 4, and this frame also serves to support a pair of pulleys 133, 134, by means of a wrist joint pulley stud 135. The body of the wrist joint pulley frame 115 has a through bore 136, into which the stud 135 is forced, the stud being provided with axially extending knurled formations by means of which it is secured against rotation with a pressed fit. At each end the pulley stud has a reduced cylindrical portion 137, which serves to receive a thrust washer 138 that spaces the pulley from the frame 115, and is engaged by the pulley shaft.

The pulley stud 135 has each end provided with a reduced threaded portion 139, which is adapted to be received in the threaded bore 140 of the pulley shaft 141.

The pulley shaft comprises a substantially cylindrical metal member, which has the threaded bore 140, and a smaller counterbore 142 for lubrication, the counterbore 142 being spun over at its end 143 to retain a steel ball 144, which is urged into engagement with the spun-over portion 143 by a compression spring 145, the other end of the spring engaging the reduced threaded end 139 of the pulley stud.

The pulley shaft also has a radially extending aperture 146 whereby lubricant which is forced in past the ball 144 may gain access to the external cylindrical bearing surface 147 of the shaft 141. The shaft 141 also supports a pulley guard 148 in the form of a substantially circular radially extending flange carried by the pulley shaft 141, which extends beyond the edge of the pulley 134 and has an inwardly extending cylindrical flange 149 overhanging the outer flange of the pulley.

The guard 148 protects the hands of the operator from the pulleys, but it does not interfere with the pulley belt, and the guard also prevents the throwing of oil, which might be carried by the pulley to its outermost edge by centrifugal force.

The pulley guard preferably has an annular thrust surface 150 located to engage the outer end of each pulley so that endwise motion of the pulley on the pulley shaft is prevented, and the pulley has a running fit between the washer 138 and the thrust surface 150.

The two pulleys may be identical in construction, and each consists of a circular metal member provided with a centrally located bearing bore 151 for receiving the pulley shaft on which the pulley has a freely rotating fit. At its periphery the pulley is provided with a partially circular groove 152, which is bordered by two radially extending pulley flanges 153, 154.

The belt passes over one of the pulleys 133 to the drive pulley 88, and thence back over the other pulley 134 to the usual motor driving mechanism.

It will thus be observed that I have invented an improved dental hand piece which is provided with improved bearing structures by means of which the hand piece operates more smoothly and may be maintained in most excellent condition for a long period of time without repair.

The pulley is quickly detachable, being held in place by a threaded gland which also serves to support the tightening rod by means of which the collet of the chuck may be controlled for gripping the shank of a tool.

The present hand piece has its wrist joint frame adjustably supported in such manner that wear of the bearings may be taken up and adequate provision is made for maintaining proper lubrication of the spindle at all times.

The wrist joint frame arm is provided with an improved built-in form of stop which may be more cheaply manufactured, and which has no projecting parts that might catch on the clothing of the operator. The wrist joint pulleys are guarded and protected on both sides, and are provided with adequate means for assuring their lubrication at all times and for preventing the pulleys from throwing off lubricant on the operator or the patient.

The present hand piece may be taken apart very easily for inspection of its parts or for cleaning, and it is also adapted to be maintained in a sanitary condition with a minimum amount of labor.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

In a dental hand piece, the combination of a chuck tightener rod with a spindle, said spindle comprising a tubular member having a cylindrical bore of substantially larger size than said rod, said rod having an integral enlargement adjacent its free end for centering the rod in said bore, said rod being provided with a threaded portion adjacent its other end and said threaded portion being mounted in a threaded bore in a gland member, said gland member being threaded into the end of said spindle, a knob threaded on the threaded end of said rod, and a transverse pin passing through a part of the knob and rod for preventing relative rotation between the knob and rod, a wrist joint member having a threaded bore and a relatively hard alloy bearing comprising a tubular member externally threaded to fit in said latter bore, said bearing having a cylindrical bearing bore for receiving said spindle, a sheath carried by said wrist joint member and surrounding said bearing member, said sheath carrying at its forward end a front bearing member, said front bearing member having an inner tapered bearing surface, and said spindle having a complementary surface, said spindle being provided with exterior chromium plated surfaces for engaging the bearings, said wrist joint member being formed with an external threaded surface for engaging a threaded sleeve, and said sleeve and sheath having annular shoulders engaging each other, whereby the sleeve may be adjustably threaded on the wrist joint member to take up and adjust the length of the sleeve with respect to wear on the tapered end of the spindle, the said wrist joint member having a transverse threaded bore, a relatively soft metal block in said bore engaging the threads of the first-mentioned bearing, and a set screw in said transverse bore engaging said soft metal block to secure the wrist joint member against rotation on said bearing without damage to the threads engaged by said soft metal block.

MARTIN STAUNT.

REFERENCES CITED

The following references are of record in the file of this patent:

UNITED STATES PATENTS

| Number | Name | Date |
|---|---|---|
| 1,753,773 | Champion | Apr. 8, 1930 |
| 1,900,874 | Wallgren | Mar. 7, 1933 |
| 1,733,762 | Tisdall | Oct. 29, 1929 |
| 1,835,961 | Pieper | Dec. 8, 1931 |
| 2,249,058 | Staunt | July 15, 1941 |
| 1,839,289 | Angell | Jan. 5, 1932 |
| 440,128 | Bonwill | Nov. 11, 1890 |
| 464,568 | Johnson | Dec. 8, 1891 |